United States Patent
Sung et al.

(10) Patent No.: US 8,380,382 B2
(45) Date of Patent: Feb. 19, 2013

(54) UNMANNED TRANSPORT APPARATUS AND OPERATING METHOD THEREOF

(75) Inventors: Junyong Sung, Daejeon (KR); Myung Chan Roh, Daejeon (KR); Jaemin Byun, Daejeon (KR); Sung Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 772 days.

(21) Appl. No.: 12/491,743

(22) Filed: Jun. 25, 2009

(65) Prior Publication Data

US 2010/0235032 A1 Sep. 16, 2010

(30) Foreign Application Priority Data

Mar. 12, 2009 (KR) .................. 10-2009-0021066

(51) Int. Cl.
*G01C 22/00* (2006.01)
(52) U.S. Cl. .................................................. 701/23
(58) Field of Classification Search .............. 701/23, 701/25, 28, 36, 41, 56, 70, 93, 121, 408, 701/409, 410, 412, 418, 419, 451, 538, 541
See application file for complete search history.

(56) References Cited

U.S. PATENT DOCUMENTS 6,571,175 B1 * 5/2003 Chen ........................... 701/538
7,079,943 B2 * 7/2006 Flann et al. .................. 701/423

FOREIGN PATENT DOCUMENTS

KR 10-2008-0053133 6/2008
WO WO 2004/066047 * 8/2004

* cited by examiner

*Primary Examiner* — Kim T Nguyen
(74) *Attorney, Agent, or Firm* — Staas & Halsey LLP

(57) ABSTRACT

An unmanned transport apparatus, includes: a call unit for providing destination information corresponding to a call location according to a call signal of a communication device; a navigation guide unit for recognizing a current location using an electronic map and searching an optimum route from the current location to a destination location of the destination information; and an image recognition unit for determining a travelling route and recognizing landmarks, stop lines, and intersections on the determined travelling route. Further, the unmanned transport apparatus includes an image capture unit for capturing input images to produce image; and a control unit for controlling a steering angle by determining a steering value from the current location to the destination location based on the travelling route and landmarks, and controlling velocity and brakes by determining velocity and brake values based on the stop lines and intersections.

18 Claims, 6 Drawing Sheets

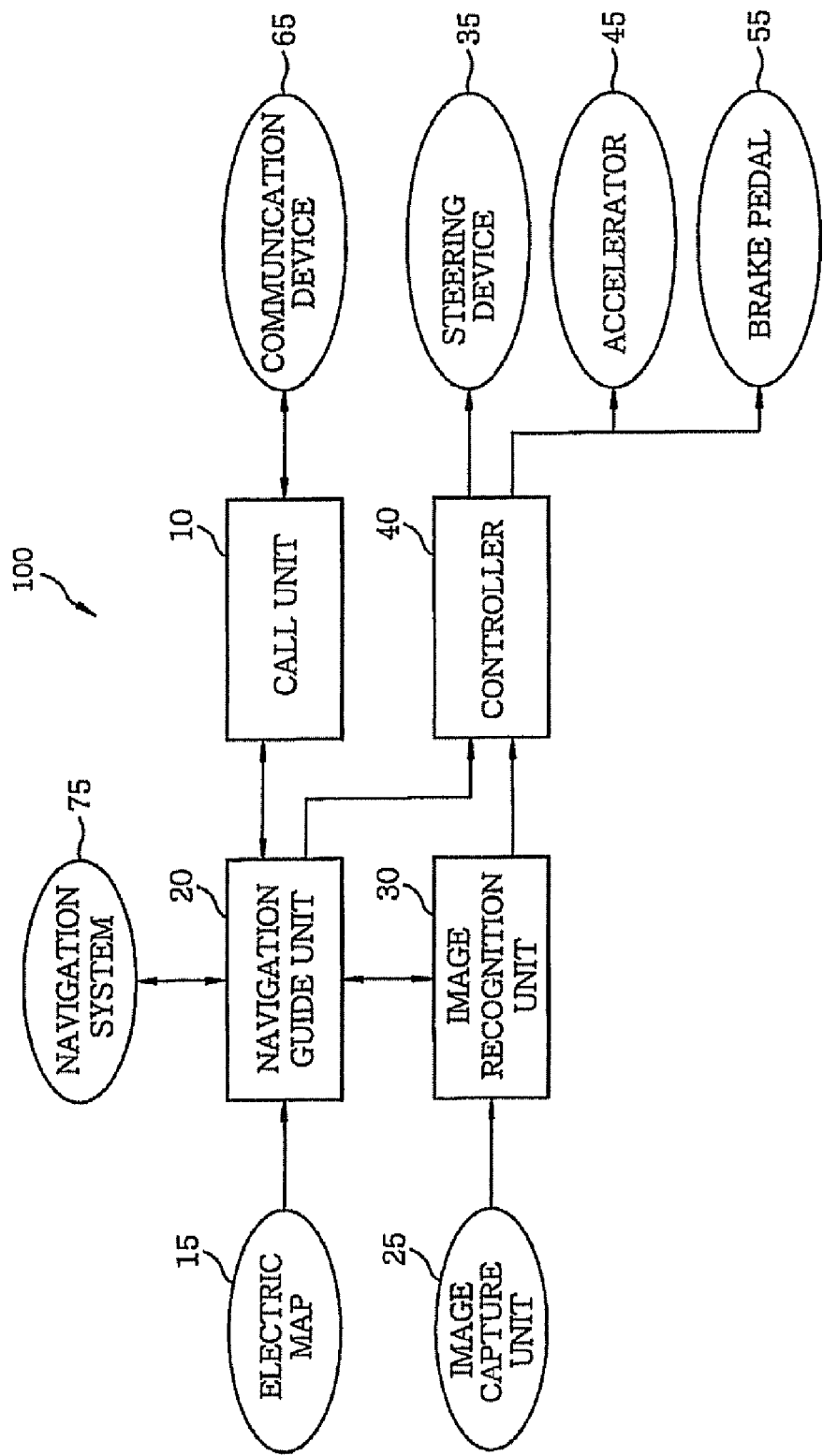

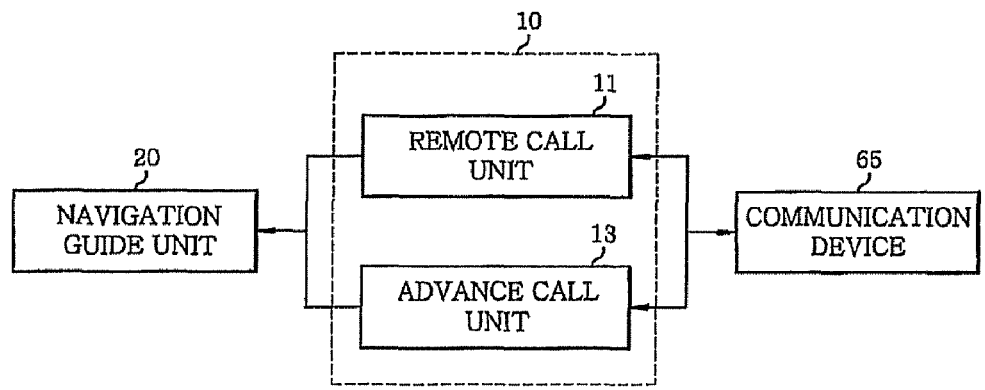
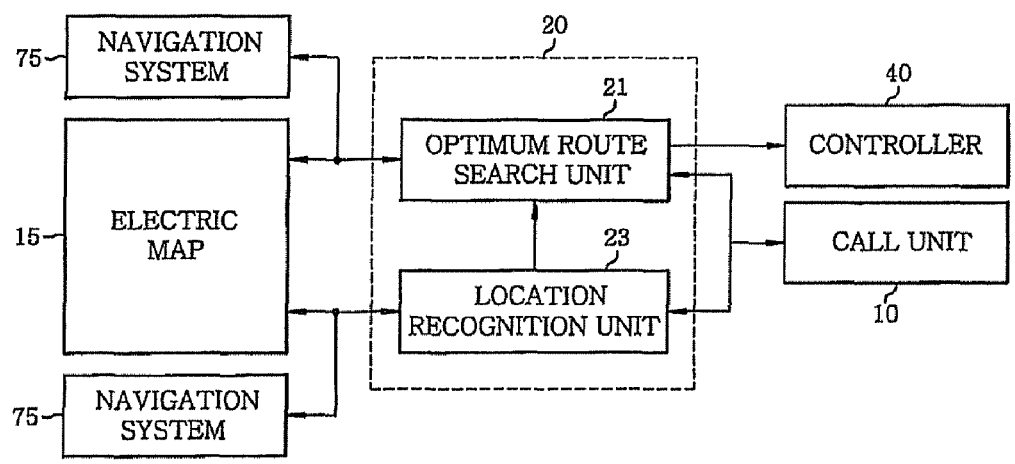

○ : INTERSECTION LANDMARK
☐ : BUILDING INFORMATION LANDMARK
⬠ : CROSSWALK AND SPEED BUMP LANDMARK

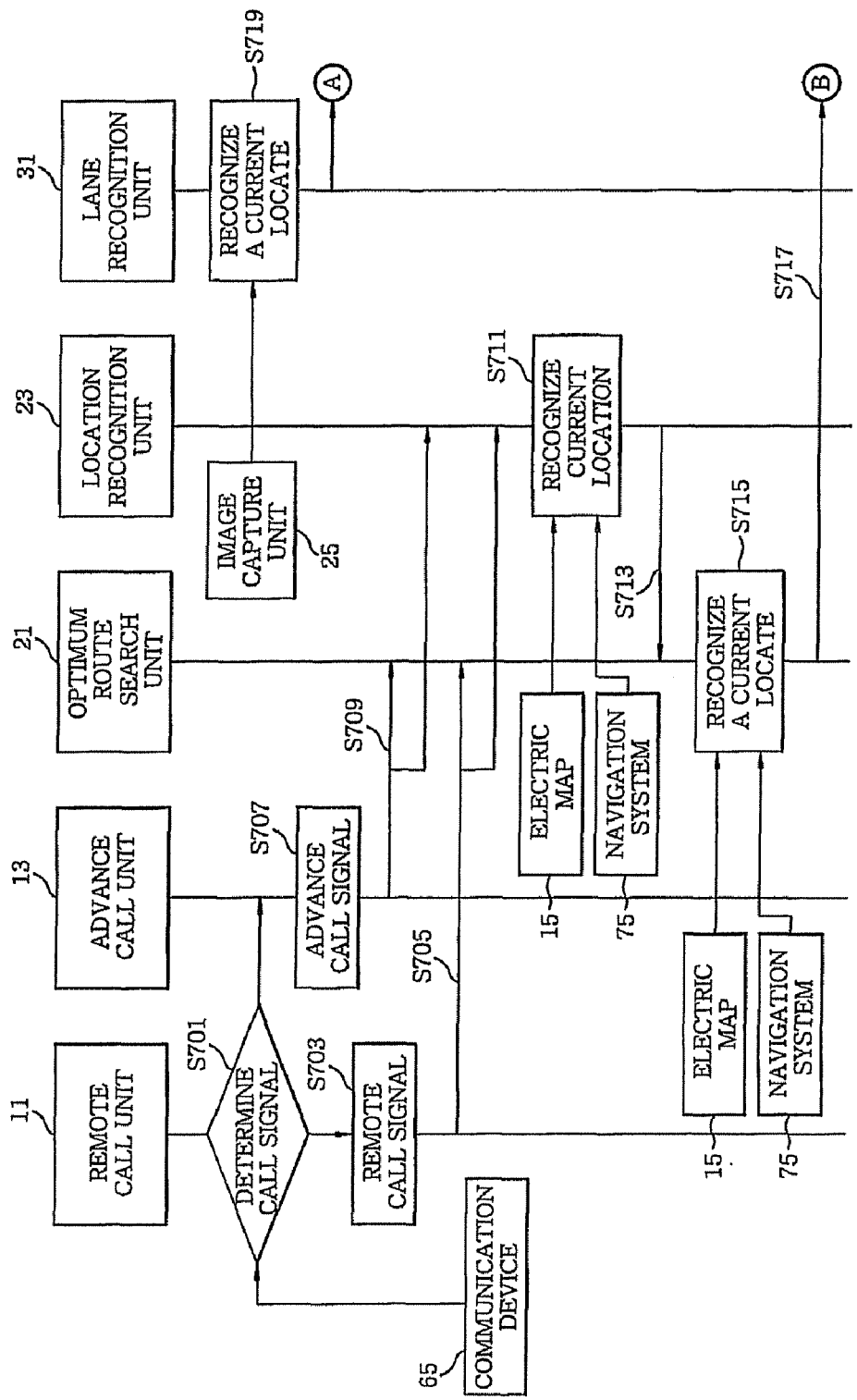

UNMANNED TRANSPORT APPARATUS AND OPERATING METHOD THEREOF

CROSS-REFERENCE TO RELATED APPLICATIONS

The present invention claims priority of Korean Patent Application No. 10-2009-0021066, filed on Mar. 12, 2009, which is incorporated herein by reference.

FIELD OF THE INVENTION

The present invention relates to an unmanned transport apparatus and an operating method thereof; and, more particularly, to an unmanned transport apparatus and an operating method thereof for transporting goods at desired time and location while searching an optimum route according to calling and route setup using an electronic map.

BACKGROUND OF THE INVENTION

An unmanned transport apparatus automatically travels by adjusting brakes, an accelerator, and a steering device in accordance with external environment conditions which have been recognized by a sensor. For example, the unmanned transport apparatus of the prior art is divided into two types; one is using a high frequency transceiver, the other is employing a monitoring camera.

The unmanned transport apparatus using the high frequency transceiver recognizes route conditions according to a loop in which a plurality of high frequency transceivers are installed at regular intervals on the both sides of a road and a high frequency transceiver equipped in a vehicle, which transmits a high frequency signal with the high frequency transceivers of the loop. Also, the unmanned transport apparatus receives high frequency signals from the transceivers of vehicles in front of and behind the vehicle and thus adjusts its speed by a central processing unit of the vehicle for thereby performing unmanned operation.

The unmanned transport apparatus using the monitoring camera detects vehicles ahead using cameras disposed at both sides of the vehicle, calculates a distance to the vehicles ahead using a central processing unit based on triangulation, and controls a speed by calculating a relative velocity with the vehicle ahead by time slots using a vehicle speed sensor.

However, these unmanned transport apparatuses according to the prior art have problems as follows. The unmanned transport apparatus using the high frequency transceiver costs a great deal in establishing and maintaining incidental facilities and sensors on a road. The unmanned transport apparatus using the high frequency transceiver also frequently generates errors in distance detection. The unmanned transport apparatus using the monitoring camera also has several problems of a relatively low velocity, generation of distance error due to difficulty in properly calculating a curve of a road, and lack of function of checking the route to the destination and detecting a current location.

SUMMARY OF THE INVENTION

In view of the above, the present invention provides an unmanned transport apparatus and an operating method thereof for transporting goods at desired time and location while searching an optimum route according to calling and route setup using an electronic map.

In accordance with a first aspect of the present invention, there is provided an unmanned transport apparatus, including: a call unit for providing destination information corresponding to a call location according to a call signal of a communication device; a navigation guide unit for recognizing a current location using an electronic map and searching an optimum route from the current location to a destination location of the destination information; an image recognition unit for determining a travelling route and recognizing landmarks, stop lines, and intersections on the determined travelling route; an image capture unit for capturing input images to produce image; and a control unit for controlling a steering angle by determining a steering value from the current location to the destination location based on the travelling route and landmarks, and controlling velocity and brakes by determining velocity and brake values based on the stop lines and intersections.

In accordance with a second aspect of the present invention, there is provided a method of operating an unmanned transport apparatus, including: providing destination information corresponding to a call location in accordance with a call signal; recognizing a current location using an electric map; searching an optimum route from the recognized current location to the location of the destination information; determining a travelling route using an image capture unit; recognizing each of landmarks, stop lines, and intersections on the determined travelling route; determining a steering value from the current location to the location of the destination information based on the travelling route and landmarks and determining velocity and brake values based on the stop lines and intersections; and controlling a steering angle, velocity, and brakes using the steering value, and the velocity and brake values.

In accordance with the present invention, the unmanned transport apparatus is able to transport goods at desired time and location. Therefore, it is possible to solve the problems of the prior arts, such as cost problem in establishing sensors, generation of errors in distance detection, and lack of function to check the route to the destination and detect a current location.

In accordance with the present invention, the unmanned transport apparatus and the operating method thereof can achieve and improve a transportation system without assistance of operators by applying an autonomous shuttle robot transport system which circulates around a regular spot as well as transports goods or persons at desired time and location.

BRIEF DESCRIPTION OF THE DRAWINGS

The objects and features of the present invention will become apparent from the following description of an embodiment given in conjunction with the accompanying drawings, in which:

FIG. 1 is a block diagram of an unmanned transport apparatus according to an embodiment of the present invention;

FIG. 2 is a detailed block diagram illustrating a calling unit of FIG. 1 in accordance with an embodiment of the present invention;

FIG. 3 is a detailed block diagram illustrating a navigation guide unit of FIG. 1 in accordance with an embodiment of the present invention;

FIGS. 7A and 7B are flow charts for describing an operating method of an unmanned transport apparatus in accordance with an embodiment of the present invention.

DETAILED DESCRIPTION OF THE EMBODIMENT

Figure 4:
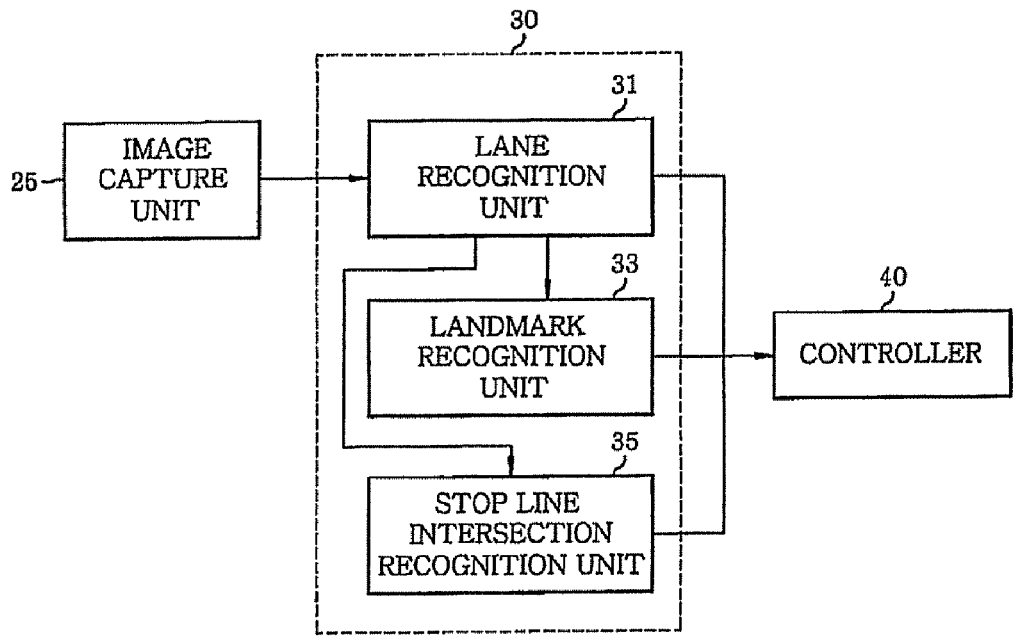
FIG. 4 is a detailed block diagram illustrating an image recognition unit of FIG. 1 in accordance with an embodiment of the present invention.

Hereinafter, an embodiment of the present invention will be described in detail with reference to the accompanying drawings, which form a part hereof.

FIG. 1 is a block diagram illustrating an unmanned transport apparatus in accordance with an embodiment of the present invention.

Referring to FIG. 1, the unmanned transport apparatus 100 of the present embodiment includes a call unit 10, a navigation guide unit 20, an image recognition unit 30, and a control unit 40.

The call unit 10 provides destination information to the navigation guide unit 20 and includes a remote call unit 11 and an advance call unit 13, as shown in FIG. 2.

The remote call unit 11 is connected to a communication device 65, such as personal digital assistant (PDA), a mobile phone, or a personal computer (PC). The remote call unit 11 provides destination information to the navigation guide unit 20 in order to call the unmanned transport apparatus 100 to the destination corresponding to a user location based on a remote call signal provided from the communication device 65.

The advance call unit 13 is also connected to the communication device 65. The advance call unit 13 provides destination information with a reservation time to the navigation guide unit 20 in order to call the unmanned transport apparatus 100 to the corresponding destination at the reserved time in accordance with an advance call signal provided from the communication device 65.

As shown in FIG. 3, the navigation guide unit 20 may be applied to an engine control unit (ECU) for electronic control or a separate embedded control system. The navigation guide unit 20 includes an optimum route search unit 21 and a location recognition unit 23.

The optimum route search unit 21 determines information about routes from a current location to a destination through a navigation system 75 based on current location information provided from a location recognition unit 23 and the destination information supplied from the call unit 10. The optimum route search unit 21 also searches an optimum route from the current location to the destination by deciding directions for every landmarks stored in an electronic map 15 to arrive at the destination. The optimum route obtained by the optimum route search unit 21 is provided to the control unit 40.

The location recognition unit 23 recognizes the current location through the navigation system 75 or landmarks stored in the electronic map 15 when receiving the destination information from the call unit 10. The recognized current location is provided to the optimum route search unit 21.

The image recognition unit 30 may also be applied to an engine control unit (ECU) for electronic control or a separate embedded control system. As shown in FIG. 4, the image recognition unit 30 includes a lane recognition unit 31, a landmark recognition unit 33, and a stop line and intersection recognition unit 35.

The lane recognition unit 31 decides a travelling route by collecting images of a road, which is captured by an image capture unit 25, and recognizing lanes on both sides of road using an image processing technique. The image capture unit 25 is a camera device installed in a room mirror of the unmanned transport apparatus 100 to capture input images for image processing. The image capture unit 25 may be one of a CCD camera, a CMOS camera, and other image obtaining device.

Further, the travelling route obtained by the lane recognition unit 31 is provided to the landmark recognition unit 33 and the stop line and intersection recognition unit 35, also to the control unit 40.

Figure 6:
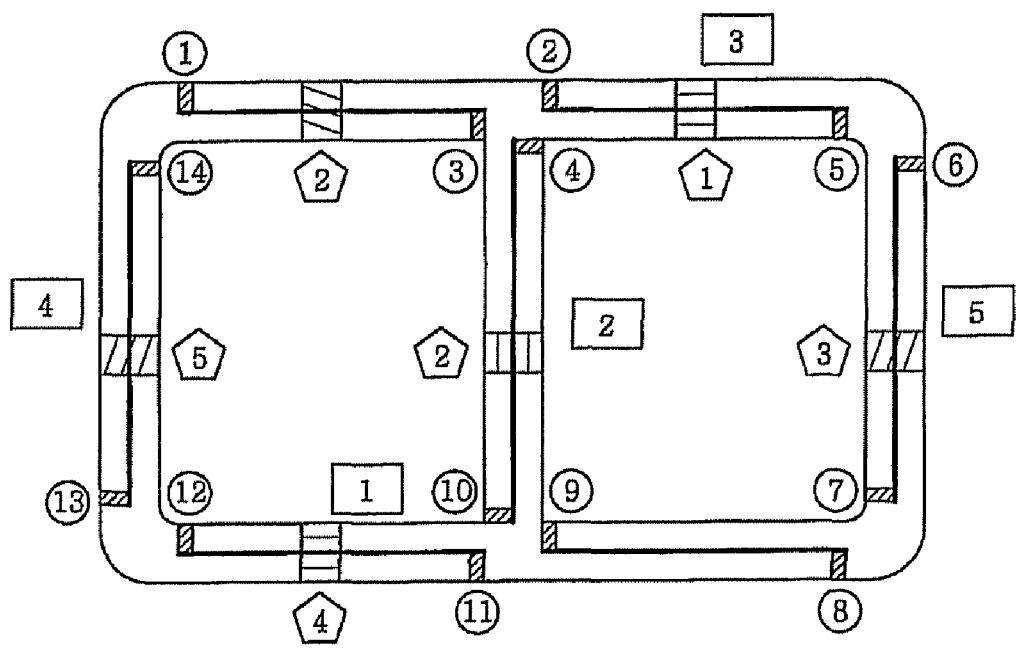
FIG. 6 is a diagram showing landmarks on a road for unmanned transport in accordance with an embodiment of the present invention.

The landmark recognition unit 33 recognizes landmarks 1 to 14 as shown in FIG. 6 equipped on the travelling route provided from the lane recognition unit 31. Then, the landmarks are provided to the control unit 40. The landmark illustrates one of the intersection, the crosswalk, the speed bump, the building info and the stop line.

In FIG. 6, a circle indicates an intersection landmark, a rectangle indicates a building info landmark, and a pentagon indicates a crosswalk and speed bump landmark.

The stop line and intersection recognition unit 35 recognizes stop lines and intersections on the travelling route from the lane recognition unit 31. The recognized data of stop lines and intersections are provided to the control unit 40.

Figure 5:
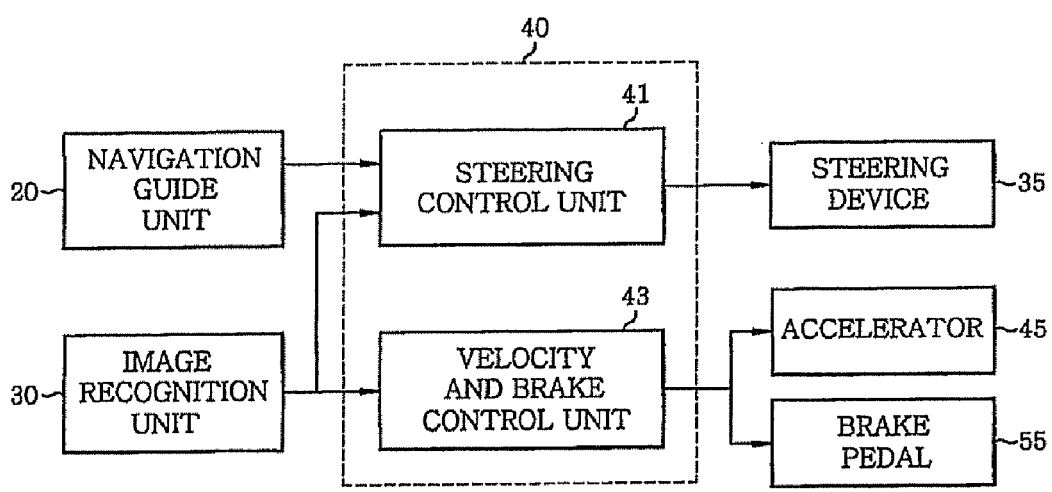
FIG. 5 is a detailed block diagram illustrating a control unit of FIG. 1 in accordance with an embodiment of the present invention.

Referring to FIG. 5, the control unit 40 also may be applied to an engine control unit (ECU) for electronic control or a separate embedded control system. The control unit 40 includes a steering control unit 41 and a velocity and brake control unit 43.

The steering control unit 41 recognizes a current location using the optimum route information from the navigation guide unit 20 and the travelling route and landmarks from the image recognition unit 30. The steering control unit 41 decides a steering value in accordance with left/right turn or straight drive information using the landmarks 1 to 14 from the recognized current location to the destination. The obtained steering value is provided to a steering device 35 of a vehicle. The steering device 35 is a handle motor that regulates a steering angle from the current location to the destination depending on the steering value from the steering control unit 41.

In addition, the velocity and brake control unit 43 decides a velocity value based on stop line and intersection data from the image recognition unit 30. For example, the velocity and brake control unit 43 decides the velocity value based on speed deduction resulted from a speed bump. Then, the velocity value is then provided to an accelerator 45 until an unmanned transport apparatus arrives at the destination location. The velocity and brake control unit 43 also sets a brake value based on the stop lines and intersections. For example, the velocity and brake control unit 43 sets a velocity value according to a stop line. Then, the velocity and brake control unit 43 keeps providing the velocity value to a brake pedal 55 until the unmanned transport apparatus arrives at the destination location. Therefore, the accelerator 45 adjusts speed from current location to the destination location in accordance with the velocity value inputted from the velocity and brake control unit 43, while the brake pedal 55 regulates a brake from the current location to the destination location based on the brake value from the velocity and brake control unit 43.

Figure 7B:
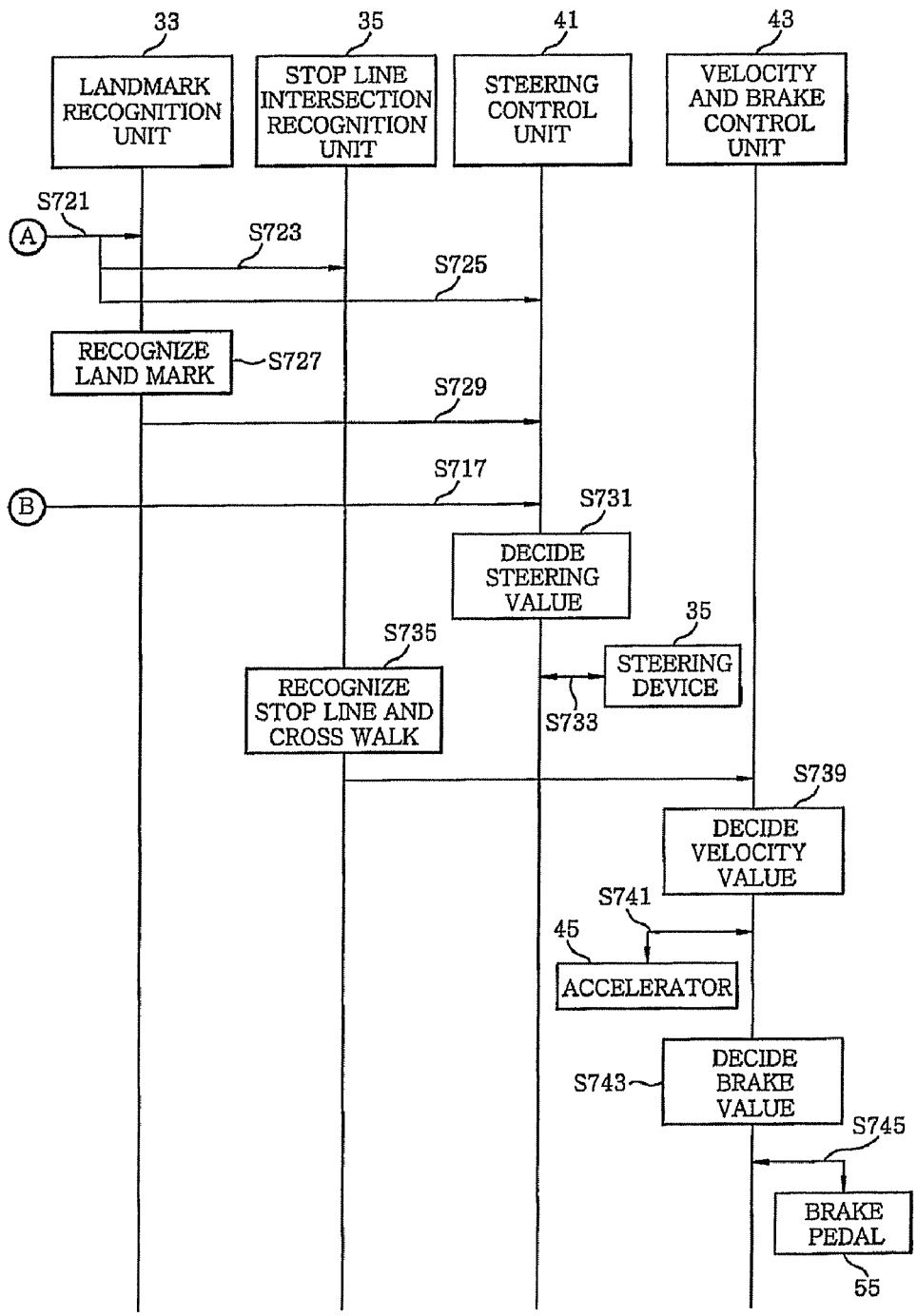

FIGS. 7A and 7B are flow charts for describing an operating method of an unmanned transport apparatus in accordance with an embodiment of the present invention.

At step S701, the call unit 10 determines that there is a call signal from the communication device 65.

If a remote call signal is received at step S703, the destination information is provided to the navigation guide unit 20 in order to call the unmanned transport apparatus 100 to the destination corresponding to a user location in accordance with the remote call signal at step S705.

On the other hand, if an advance signal is received as at step S707, the advance call unit 13 provides destination information with the reservation time to the navigation guide unit 20 in order to call the unmanned transport apparatus 100 to the destination corresponding to the reserved time and location in accordance with the advance call signal at step S709.

When the destination information is inputted from the call unit 10, the navigation guide unit 20 recognizes the current location through landmarks and provides the recognized current location to the optimum route search unit 21 at step S713

Then, the optimum route search unit 21 determines information about routes from the current location to the destination in accordance with the destination information sent from the call unit 10, searches an optimum route to the destination from the current location by determining directions to every landmarks at step S715, and provides the optimum route to the steering control unit 41 of the control unit 40 at step S717.

At step S719, the image recognition unit 30 determines a travelling route by collecting road images captured by the image capture unit 25 and recognizing lanes on both sides of the road. The lane recognition unit 40 provides the determined travelling route to the landmark recognition unit 33 at step S721, the stop line and intersection recognition unit 35 at step S723, and the control unit 40 at step S715. At step S729, the landmark recognition unit 33 recognizes landmarks on the travelling path and provides the recognized landmarks to the steering control unit 41 of the control unit.

The steering control unit 41 recognizes the current location based on the optimum route and the travelling route and landmarks. Then, the steering control unit 41 decides a steering value in accordance with left/right turn or straight drive information using the landmarks from the recognized current location to the location of the destination information at step S731. At step S733, the steering control unit 41 provides the obtained steering value to the steering device 35, and the steering device 35 regulates a steering angle from the current location to the destination of the destination information in accordance with the steering value inputted from the steering control unit 41.

At step S735, the stop line and intersection recognition unit 35 recognizes stop lines and intersections on the travelling route. At step S737, the step line and intersection recognition unit 35 provides the recognized stop line and intersection data to the velocity and brake control unit 43 of the control unit 40.

At step S739, the velocity and brake control unit 43 of the control unit 40 decides a velocity value based on the stop line and intersection data inputted from the stop line and intersection recognition unit 35 of the image recognition unit 30 and provides the decided velocity value to the accelerator 45 until the unmanned transport apparatus arrives at the location of destination information. At step S741, the accelerator 45 adjusts speed from the current location to the location of the destination information in accordance with the velocity value inputted from the velocity and brake control unit 43.

At step S743, the velocity and brake control unit 43 of the control unit 40 determines a brake value based on the stop line and intersection data, and provides the brake value to the brake pedal 55 until the unmanned transport apparatus arrives at the destination of the destination information. At step S745, the brake pedal 55 regulates a brake from the current location to the destination of the destination information in accordance with the brake value.

As described above, the unmanned transport apparatus and the operating method thereof according to the present invention can achieve and improve a transportation system without assistance of operators by applying an autonomous shuttle robot transport system which circulates around a regular spot as well as transports goods or persons at desired time and location.

While the invention has been shown and described with respect to the embodiment, it will be understood by those skilled in the art that various changes and modifications may be made without departing from the scope of the invention as defined in the following claims.

What is claimed is:

1. An unmanned transport apparatus, comprising:
   a call unit for providing destination information corresponding to a call location according to a call signal of a communication device;
   a navigation guide unit for recognizing a current location using an electronic map and searching an optimum route from the current location to a destination location of the destination information using a navigation system;
   an image recognition unit for determining a travelling route and recognizing landmarks, stop lines, and intersections on the determined travelling route;
   an image capture unit for capturing input images to produce image; and
   a control unit for controlling a steering angle by determining a steering value from the current location to the destination location based on the travelling route and landmarks, and controlling velocity and brakes by determining velocity and brake values based on the stop lines and intersections,
   wherein the call unit includes:
   a remote call unit for providing the destination information to the navigation guide unit to call the unmanned transport apparatus to the destination location corresponding to a user location in accordance with a remote call signal; and
   an advance call unit for providing the destination information including a reservation time to call the unmanned transport apparatus to the destination location corresponding to the reserved time and destination location in accordance with an advance call signal.

2. The apparatus of claim 1, wherein the communication device is one of a personal digital assistance (PDA), a mobile phone, and a personal computer (PC) which is internet accessible through the internet.

3. The apparatus of claim 1, wherein the navigation guide unit includes:
   a location recognition unit for recognizing the current location using landmarks stored in the electronic map; and
   an optimum route search unit for deciding the destination information at the current location based on the current location through the navigation system, and searching the optimum route by deciding directions to every landmarks stored in the electronic map to arrive at the destination location.

4. The apparatus of claim 3, wherein the landmark includes an intersection, a crosswalk, a speed bump, building information, and a stop line.

5. The apparatus of claim 1, wherein the image recognition unit includes:
   a lane recognition unit for determining a travelling route by collecting lane images captured by the image capture unit and recognizing lanes on both sides by an image processing technique;
   a landmark recognition unit for recognizing landmarks on the determined travelling route; and a stop line and intersection recognition unit for recognizing stop lines and intersections on the determined travelling route.

6. The apparatus of claim 5, wherein the image capture unit includes a camera device installed in the unmanned transport apparatus.

7. The apparatus of claim 6, wherein the camera device is a CCD camera or a CMOS camera.

8. The apparatus of claim 1, wherein the control unit includes:
   a steering control unit for controlling the steering angle by recognizing the current location based on the optimum route, the travelling route and landmarks, and determining the steering value using the landmarks from the recognized current location to the destination location; and
   a velocity and brake control unit for controlling the velocity and brakes by determining the velocity and brake values based on the stop lines and intersections to the destination location.

9. A method of operating an unmanned transport apparatus, comprising:
   providing destination information corresponding to a call location in accordance with a call signal inputted from a communication device;
   recognizing a current location using an electric map;
   searching an optimum route from the recognized current location to a destination location of the destination information using a navigation system;
   determining a travelling route using an image capture unit;
   recognizing each of landmarks, stop lines, and intersections on the determined travelling route;
   determining a steering value from the current location to the destination location of the destination information based on the travelling route and landmarks and determining velocity and brake values based on the stop lines and intersections; and
   controlling a steering angle, velocity, and brakes using the steering value, and the velocity and brake values,
   wherein said providing destination information includes:
   determining a call signal inputted from the communication device;
   when the call signal is determined as a remote call signal, providing the destination information to a navigation guide unit to call the unmanned transport apparatus to the destination location which corresponds to a user location; and
   when the call signal is determined as an advance call signal, providing the destination information which includes reservation time to reserve and call the unmanned transport apparatus to the destination information corresponding to the reserved time and destination location.

10. The method of claim 9, wherein the communication device is one of an internet accessible personal digital assistant (PDA), a mobile phone, or a personal computer (PC).

11. The method of claim 9, wherein in said recognizing the current location, the current location is recognized through landmarks stored in the electronic map or a navigation system.

12. The method of claim 11, wherein the landmark is one of an intersection, a crosswalk, a speed bump, building information, and a stop line.

13. The method of claim 9, wherein in said searching the optimum route, the destination information at the current location is determined through a navigation system based on the current location and to search an optimum route by determining directions to every landmarks stored in the electronic map to arrive at the destination location.

14. The method of claim 9, wherein in said determining the travelling route, road images taken by the image capture unit are collected and lanes on both sides of the road are recognized by an image processing technique.

15. The method of claim 9, wherein the image capture unit is a CCD camera or a CMOS camera which obtains input images to perform image processing.

16. The method of claim 9, wherein said determining the steering value includes:
   determining the steering value by recognizing the current location based on the optimum route and the travelling route and landmarks and using the landmarks from the recognized current location to the destination location of the destination information; and
   wherein the determining the velocity and brake values includes:
   determining the velocity and brake values based on the stop lines and intersections to the destination location of the destination information.

17. The method of claim 9, wherein said controlling the steering angle, velocity, and brakes including:
   controlling the steering angle by regulating a steering device from the current location to the destination location of the destination information in accordance with the determined steering value;
   controlling the velocity by regulating an accelerator from the current location to the destination location of the destination information in accordance with the determined velocity value; and
   controlling the brakes by regulating a brake pedal from the current location to the destination location of the destination information in accordance with the determined brake value.

18. The method of claim 17, wherein the steering angle is left/right turn or straight drive information in accordance with the route of the destination information.

* * * * *